ized patent

United States Patent
Chen et al.

(10) Patent No.: US 9,313,467 B2
(45) Date of Patent: Apr. 12, 2016

(54) PIXEL VALUE CALIBRATION DEVICE AND METHOD

(71) Applicant: REALTEK SEMICONDUCTOR CORPORATION, Hsinchu (TW)

(72) Inventors: Shih-Tse Chen, Hsinchu County (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 9 days.

(21) Appl. No.: 14/565,091

(22) Filed: Dec. 9, 2014

(65) Prior Publication Data

US 2015/0262360 A1 Sep. 17, 2015

(30) Foreign Application Priority Data

Mar. 12, 2014 (TW) .............................. 103108840 A (51) Int. Cl.
H04N 17/02 (2006.01)
H04N 17/00 (2006.01)
H04N 9/04 (2006.01)
G06T 3/40 (2006.01)

(52) U.S. Cl.
CPC .............. *H04N 9/045* (2013.01); *G06T 3/4015* (2013.01); *H04N 17/002* (2013.01); *H04N 17/02* (2013.01)

(58) Field of Classification Search
CPC ..... H04N 17/002; H04N 17/02; H04N 17/00; H04N 9/045; G06T 7/0018; G06T 7/0085; G06T 7/002; G06T 3/4015
USPC ................... 348/180, 184, 187, 189; 382/167
IPC ............................................. H04N 17/02, 17/00
See application file for complete search history.

(56) References Cited

U.S. PATENT DOCUMENTS

| 5,596,367 | A | 1/1997 | Hamilton, Jr. et al. |
| 2002/0167602 | A1 | 11/2002 | Nguyen |
| 2005/0213813 | A1* | 9/2005 | Lin ....................... G06T 7/0018 382/167 |
| 2007/0133893 | A1 | 6/2007 | Jerdev |
| 2010/0034481 | A1 | 2/2010 | Forutanpour |

FOREIGN PATENT DOCUMENTS

| TW | 200726263 A | 7/2007 |
| TW | 200806010 A | 1/2008 |
| TW | 201108720 A | 3/2011 |

OTHER PUBLICATIONS

Office Action dated Nov. 24, 2015 for counterpart Taiwan patent application 103108840.
English abstract translation of the Office Action dated Nov. 24, 2015 for counterpart Taiwan patent application 103108840.
TW201108720A is also published as US2010034481A1.
TW200806010A is also published as US2007133893A1.

* cited by examiner

*Primary Examiner* — Sherrie Hsia
(74) *Attorney, Agent, or Firm* — WPAT, P.C., Intellectual Property Attorneys; Anthony King (57) ABSTRACT

A pixel value calibration device comprises: an edge detecting unit to generate edge values according to the target pixel value of a target pixel and the pixel values of neighboring pixels in which the target and neighboring pixels are of a first color and each of them is arranged with pixels of a second color in the same pixel row; a weighted value estimating unit to generate weighted values according to the edge values and an algorithm in which the weighted values are associated with candidate pixels each of which is arranged with pixels of a third color in the same pixel row; a calibration value generating unit to generate a calibration value according to the target pixel value and the pixel value(s) of the candidate pixel(s) plus the weighted value(s) thereof; and a calibrating unit to generate a calibrated pixel value according to the target pixel and calibration values.

20 Claims, 11 Drawing Sheets

PIXEL VALUE CALIBRATION DEVICE AND METHOD

BACKGROUND OF THE INVENTION

1. Field of the Invention

The present invention relates to an image calibration device and the related method, especially to an image calibration device and the related method capable of solving the problem of green color non-uniformity of an image.

2. Description of Related Art

Figure 1:
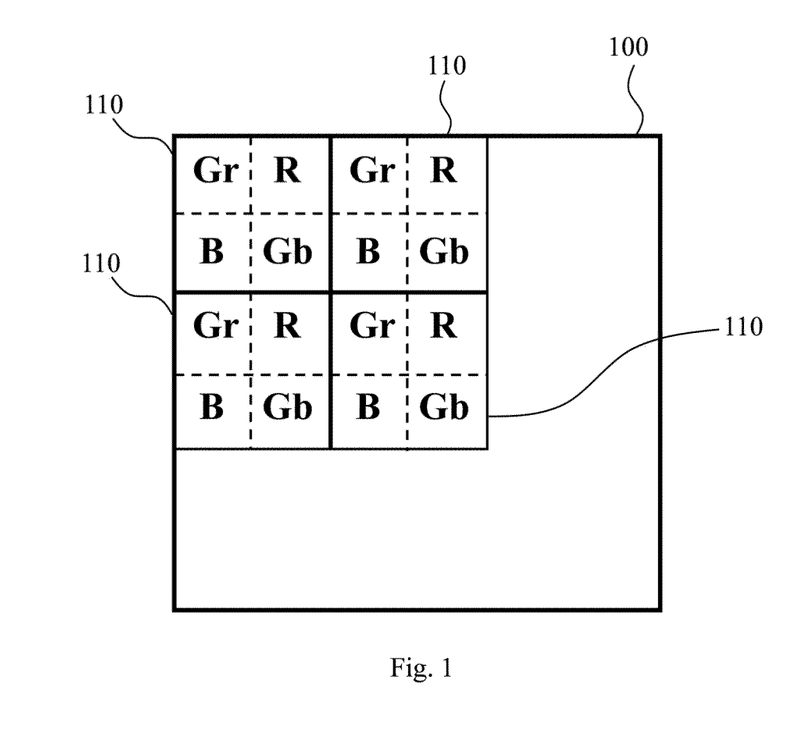
FIG. 1 illustrates a Bayer Color Filter Array.

An electronic product such as a digital camera, a video camera, a multimedia cell phone, a monitoring system, a tablet PC, or etc. makes use of a single sensor to take a picture. Such kind of sensor usually takes down the information of red, green and blue colors simultaneously by a Bayer Color Filter Array (Bayer CFA) to reduce the manufacturing cost. As it is shown in FIG. 1, a Bayer CFA 100 includes a plurality of Bayer patterns 110 which is composed of four sensing units. These four sensing units keep the information of red, green, green, blue (R, Gr, Gb, B) colors respectively through a color filter, so as to constitute a basic unit composed of three primary colors. A full color image is then obtained by an interpolation procedure (i.e. a de-mosaicking procedure) processing the raw Bayer CFA image from the single sensor.

Figure 2:
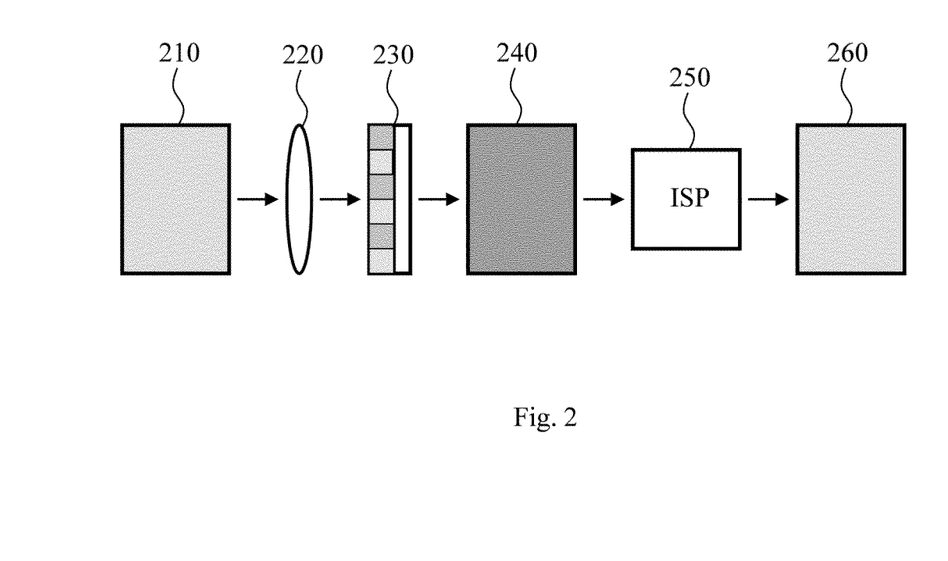
FIG. 2 illustrates the procedure for the generation of a full color image.

The procedure for the generation of the said full color image is shown in FIG. 2. Through a lens 220 and a sensor 230 (including a color filtering array), a raw Bayer CFA image 240 can be obtained from shooting an external scene 210; the raw Bayer CFA image 240 is then processed by an image sensor pipeline (ISP) procedure 250 (including the aforementioned interpolation procedure) and turned into a full color image 260. However, the raw Bayer CFA image 240 often carries the phenomena of image error or fidelity loss due to the manufacturing detects of the lens, sensor, or image sensing module. If the ISP procedure 250 ignores these influences, a lot of unusual patterns visible to the naked eyes will appear on the finally outputted full color image 260. For instance, the problematic sensing unit of a sensor will lead to the bright spot in a picture of deep color or the dark spot in a picture of light color; and the green color non-uniformity (which means the disparity between the green pixels (Gr) arranged with red pixels in the same row and the green pixels (Gb) arranged with blue pixels in the same row in a smooth image area generated under uniform illumination) will lead to the phenomena of fidelity loss such as the maze pattern and color tint of a full color image after the execution of the mentioned interpolation procedure. Therefore, the ISP procedure plays an important role in the quality of the final output image.

In general, an ISP procedure will carry out detection and calibration against problematic pixels and green color non-uniformity of the raw image before executing an interpolation procedure in which the solution to the problematic pixels has been studied a lot while the calibration on the green color non-uniformity is rarely discussed. However, as it is described in the preceding paragraph, the green color non-uniformity will lead to the phenomena of fidelity loss such as the maze pattern and color tint visible to the naked eyes, and thus this problem shouldn't be neglected. Accordingly, some people in this art field bring up calibration techniques to tackle the green color non-uniformity; unfortunately, in these techniques, some requires an independent calibration unit to take care of the green color non-uniformity, which leads to the increase of cost due to the installation of extra buffer memories necessary for the communication between the independent calibration unit and other units while the manner adopted by the independent calibration unit to tell the green color non-uniformity from the texture is still ineffective; some combines a green color non-uniformity calibration unit with an interpolation processing unit to save the employment of extra buffer memories, but the difficulty in telling the green color non-uniformity from the texture remains unsolved, which makes the detail of the calibrated image blurred and causes the loss of the high-frequency information in connection with the image resolution while the mentioned maze pattern is still living.

People who are interested in the prior arts may refer to the following documents: U.S. Pat. No. 5,596,367; and US patent application of publication number 20020167602.

SUMMARY OF THE INVENTION

In consideration of the problem of the prior arts, an object of the present invention is to provide a pixel value calibration device and method to improve the prior arts.

Another object of the present invention is to provide a pixel value calibration device and method capable of dealing with the non-uniformity of the same color such as the non-uniformity of green color.

The present invention discloses a pixel value calibration device operable to calibrate the pixel value of a target pixel. An embodiment of the said pixel value calibration device comprises: an edge detecting unit operable to generate a plurality of edge detection values according to the pixel value of the target pixel and the pixel values of several neighboring pixels in which the target and neighboring pixels are of a first color and each of them is arranged with several pixels of a second color in the same row of a pixel array; a weighted value estimating unit operable to generate a plurality of weighted values according to the edge detection values and a predetermined algorithm in which the weighted values are associated with a plurality of candidate pixels while each of the candidate pixels is arranged with several pixels of a third color in the same row of the pixel array; a calibration value generating unit operable to generate a calibration value according to the pixel value of the target pixel and the pixel value(s) of some or all of the candidate pixels plus the weighted value(s) corresponding thereto; and a calibrating unit operable to generate a calibrated pixel value of the target pixel according to the pixel value of the target pixel and the calibration value.

The present invention also discloses a pixel value calibration method operable to calibrate the pixel value of a target pixel. This method can be carried out by the pixel value calibration device of the present invention or the equivalent thereof. An embodiment of this method comprises the following steps: an edge detecting step operable to generate a plurality of edge detection values according to the pixel value of the target pixel and the pixel values of several neighboring pixels in which the target and neighboring pixels are of a first color and each of them is arranged with several pixels of a second color in the same row of a pixel array; a weighted value estimating step operable to generate a plurality of weighted values according to the edge detection values and a predetermined algorithm in which the weighted values are associated with a plurality of candidate pixels while each of the candidate pixels is arranged with several pixels of a third color in the same row of the pixel array; a calibration value generating step operable to generate a calibration value according to the pixel value of the target pixel and the pixel value(s) of some or all of the candidate pixels plus the weighted value(s) corresponding thereto; and a calibrating step operable to generate a calibrated pixel value of the target pixel according to the pixel value of the target pixel and the calibration value.

The pixel value calibration device and method are capable of solving the problem of green color non-uniformity for an image, and thereby prevent the phenomena of fidelity loss such as the maze pattern and color tint while giving consideration to the maintenance of image texture or edge details.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention field. If any term is defined in this specification, such term should be explained accordingly. Besides, the connection between objects or events in the disclosed embodiments can be direct or indirect provided that these embodiments are still practicable under such connection. Said "indirect" means that an intermediate object or a physical space is existed between the objects, or an intermediate event or a time interval is existed between the events.

The present invention discloses a pixel value calibration device and method capable of calibrating the pixel value of a target pixel, so as to make an improvement on the prior art over the green color non-uniformity, prevent the phenomena of fidelity loss such as the maze pattern and color tint, and avoid the occurrence of blurred image texture or edge. The device and method are applicable to an integrated circuit (e.g. an image processing IC) or a system device (e.g. a stationary or portable image processing device). Provided that an alternative means is available and reasonable, people of ordinary skill in the art can use such means similar or equivalent to that described in this specification to carry out the present invention, which implies that the scope of this invention is not limited to the embodiments in this specification. On account of that some element of the pixel value calibration device of the present invention could be known, the detail of such element will be omitted provided that this omission nowhere dissatisfies the specification and enablement requirements. Besides, the pixel value calibration method can be in the form of firmware and/or software which could be carried out by the device of this invention or the equivalent thereof; therefore, provided that the remaining disclosure is still enough for understanding and enablement, the following description will abridge the hardware details for carrying out the method, but put the emphasis on the steps. Please note that each embodiment in the following description includes one or more features; however, this doesn't mean that one carrying out the present invention should make use of all the features of one embodiment at the same time, or should only carry out different embodiments separately. In other words, if an implementation derived from one or more of the embodiments is practicable, a person of ordinary skill in the art can selectively make use of some or all of the features in one embodiment or selectively make use of the combination of some or all features in several embodiments to have the implementation come true, so as to increase the flexibility of carrying out the present invention.

Figure 3:
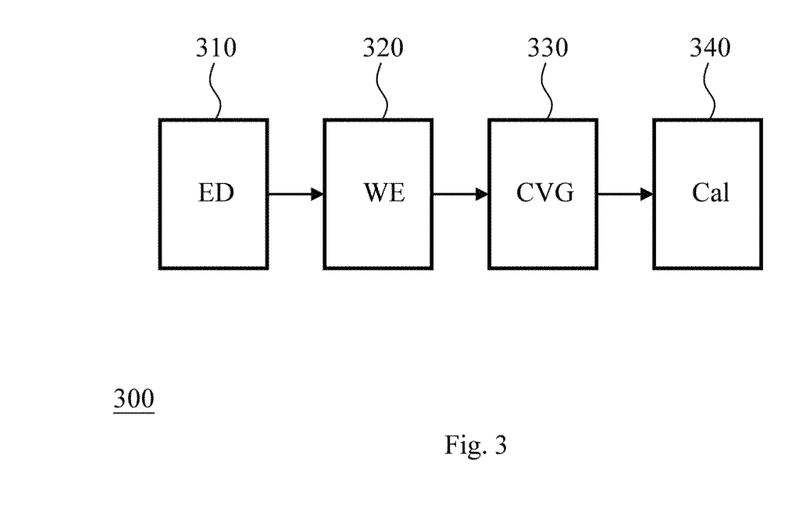
FIG. 3 illustrates an embodiment of the pixel value calibration device of the present invention.

Please refer to FIG. 3 which illustrates an embodiment of the pixel value calibration device of the present invention. As it is shown in FIG. 3, the pixel value calibration device 300 in this embodiment comprises: an edge detecting unit (ED) 310; a weighted value estimating unit (WE) 320; a calibration value generating unit (CVG) 330; and a calibrating unit (Cal) 340. Said edge detecting unit 310 is operable to generate a plurality of edge detection values according to the pixel value of a target pixel and the pixel values of a plurality of neighboring pixels in which the target and neighboring pixels are of a first color and each of the target and neighboring pixels is arranged with several pixels of a second color in the same row of a pixel array. For instance, the said first color is green in a Bayer Color Filter Array (Bayer CFA), and could be the green color Gb associated with blue pixels in the concerned pixel row while the second color is blue, or the first color is the green color Gr associated with red pixels in the concerned pixel row while the second color is red. Said weighted value estimating unit 320 is coupled with the edge detecting unit 310 and operable to generate a plurality of weighted values according to the edge detection values and a predetermined algorithm in which the weighted values are associated with a plurality of candidate pixels while each of the candidate pixels is arranged with several pixels of a third color in the same row of the aforementioned pixel array. For instance, if the first color is the green color Gb associated with the blue pixels in the concerned pixel row, the third color will be red R while the color of each candidate pixel is the green color Gr; on the contrary, if the first color is the green color Gr associated with the red pixels in the concerned pixel row, the third color will be blue B while the color of each candidate pixel is the green color Gb. Said calibration value generating unit 330 is coupled with the weighted value estimating unit 320 and operable to generate a calibration value according to the pixel value of the target pixel and the pixel value(s) of some or all of the candidate pixels plus the weighted value(s) corresponding thereto. In this embodiment, if all pixels in the said pixel array has been examined by a problematic pixel filtering rule, the candidate pixels passing through the filtering rule are eligible to be used for the generation of the calibration value; however, if the pixel array is not examined completely, some pixels therein could be problematic, and these problematic pixels should be excluded (which will be explained in the later paragraph), so that only the qualified candidate pixel(s) will be used for the generation of the calibration value. Please note that people of ordinary skill in the art are free and able to establish a rule to use some or all of the candidate pixels for the generation of the calibration value. Finally, said calibrating unit 340 is coupled with the calibration value generating unit 330 and operable to generate a calibrated pixel value of the target pixel according to the pixel value of the target pixel and the calibration value.

Figure 4:
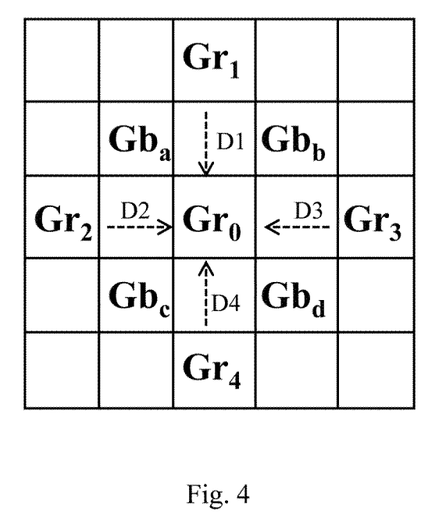
FIG. 4 illustrates an exemplary implementation of the edge detecting unit in FIG. 3.

Please refer to FIG. 4 which illustrates an exemplary implementation (that is to say a detection manner here) of the edge detecting unit 310. As it is shown in FIG. 4, the target pixel is a green pixel $Gr_0$ lined up with red pixels in the same row it belongs; the neighboring pixels are the four green pixels $Gr_1$, $Gr_2$, $Gr_3$, $Gr_4$ closest to the target pixel $Gr_0$ providing each of the neighboring pixels is lined up with red pixels in the same row similarly; and the candidate pixels are the four green pixels $Gb_a$, $Gb_b$, $Gb_c$, $Gb_d$ closest to the target pixel $Gr_0$ on condition that each of the candidate pixels is lined up with blue pixels in the same row. In light of the above, the edge detecting unit 310 may derive four edge detection values D1, D2, D3, D4 as follows:

$$D1=|Gr_0-Gr_1|$$

$$D2=|Gr_0-Gr_2|$$

$$D3=|Gr_0-Gr_3|$$

$$D4=|Gr_0-Gr_4|$$

Figure 5:
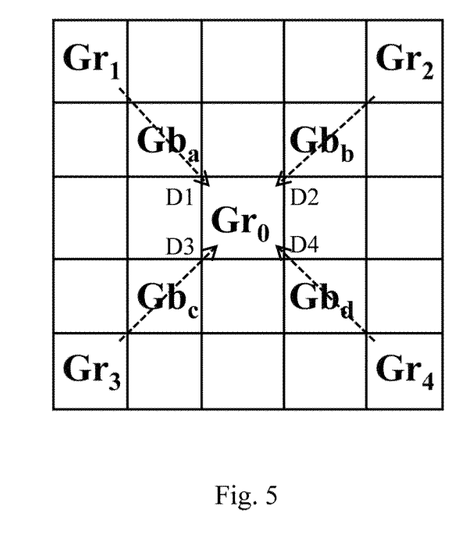
FIG. 5 illustrates another exemplary implementation of the edge detecting unit in FIG. 3.

With the four edge detection values, the weighted value estimating unit 320 will be able to generate a plurality of weighted values accordingly for the following calibration procedure. Besides, please refer to FIG. 5 which illustrates another exemplary implementation of the edge detecting unit 310. As it is shown in FIG. 5, the target pixel is still the green pixel $Gr_0$ lined up with red pixels in the same row; the neighboring pixels are the four green pixels $Gr_1$, $Gr_2$, $Gr_3$, $Gr_4$ at the diagonal positions in relation to the target pixel $Gr_0$ while each of the neighboring pixels is lined up with red pixels as well; and the candidate pixels are still the four green pixels $Gb_a$, $Gb_b$, $Gb_c$, $Gb_d$ closest to the target pixel $Gr_0$ while every candidate pixel is lined up with blue pixels in the same row. In accordance with the above, the edge detecting unit 310 is able to derive four edge detection values D1, D2, D3, D4 as follows:

$$D1=|Gr_0-Gr_1|$$

$$D2=|Gr_0-Gr_2|$$

$$D3=|Gr_0-Gr_3|$$

$$D4=|Gr_0-Gr_4|$$

After finishing the generation of the edge detection values, the weighted value estimating unit 320 is then allowed to generate the weighted values. Please note that people of ordinary skill in the art may derive more ways from the examples of FIG. 4 and FIG. 5 to generate edge detection values; for instance, the color of the target pixel could be the green color Gb instead of the green color Gr while pixels should be reelected to the neighboring and candidate pixels; for another instance, the neighboring pixels at the horizontal, vertical and diagonal positions in relation to the target pixel could be used concurrently to get more available edge detection values; for a further instance, the edge detection values could be derived according to some different equation (such as an equation dividing the absolute value of the difference between the target pixel and every neighboring pixel by the distance between them). All the mentioned instances are embraced by the scope of the present invention. Please also note that although the size of the pixel array in FIG. 4 and FIG. 5 for edge detection is 5×5 (while the size of the pixel array of the entire image will be larger in most cases), those of ordinary skill in the art may expand the array size for edge detection to enhance the accuracy of edge detection result. For instance, an alternative embodiment of the present invention adopts a 9×9 pixel array for edge detection; in this case, the edge detecting unit 310 may calculate the edge detection values by employing a weighted method, so as to give more weight to the neighboring pixel ($G_{near}$) closer to the target pixel, reduce the weight of the neighboring pixel ($G_{far}$) farther from the target pixel and thereby make an improvement in the edge detection accuracy. An example of the said weighted method could be realized through the following equation:

$$D=(G_{center}-G_{near})\times(\tfrac{3}{4})+(G_{near}-G_{far})\times(\tfrac{1}{4})$$

Accordingly, each of the edge detection values can be obtained with the above equation. Of course other equations or weighted parameters could be introduced into the present invention as long as the consequent implementation is practicable.

On the basis of the above, after the generation of the edge detection values, the weighted value estimating unit 320 is operable to generate the weighted values according to the edge detection values and the aforementioned predetermined algorithm. For instance, the weighted value estimating unit 320 may generate a plurality of weighted values according to the edge detection values D1, D2, D3, D4 of FIG. 4 and the predetermined algorithm (denoted by the symbol of function ƒ) as follows:

$$W_a=(f(D1)+f(D2))/8$$

$$W_b=(f(D1)+f(D3))/8$$

$$W_c=(f(D2)+f(D4))/8$$

$$W_d=(f(D3)+f(D4))/8$$

in which the weighted values $W_a$, $W_b$, $W_c$, $W_d$ are associated with the candidate pixels $Gb_a$, $Gb_b$, $Gb_c$, $Gb_d$ respectively. For another instance, the weighted value estimating unit 320 may generate the plurality of weighted values according to the edge detection values D1, D2, D3, D4 of FIG. 5 and the predetermined algorithm as follows:

$$W_a=(f(D1))/4$$

$$W_b=(f(D2))/4$$

$$W_c=(f(D3))/4$$

$$W_d=(f(D4))/4$$

In which the weighted values $W_a$, $W^b$, $W_c$, $W_d$ are related to the candidate pixels $Gb_a$, $Gb_b$, $Gb_c$, $Gb_d$ respectively. Other equations for the generation of weighted values can be derived by those of ordinary skill in the art from the above description in view of their demands.

Figure 6:
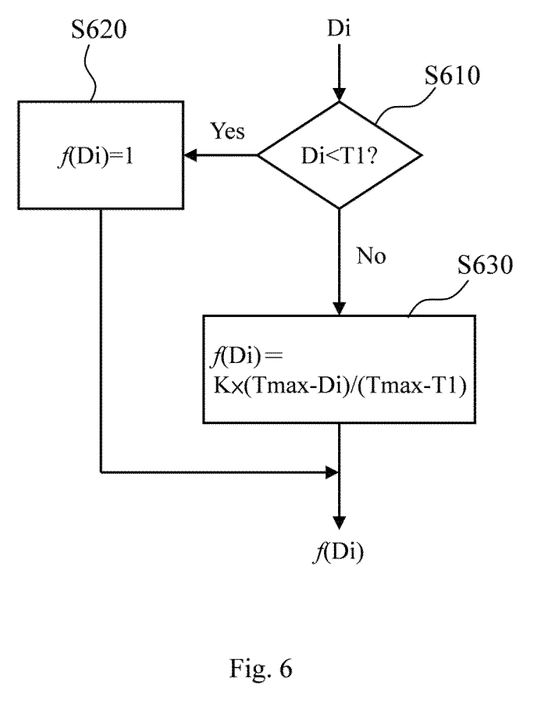
FIG. 6 illustrates an embodiment of the predetermined algorithm of the weighted value estimating unit in FIG. 3.

The aforementioned predetermined algorithm is capable of giving each of the edge detection values an appropriate weighting in accordance with its proportion; of course those of ordinary skill in the art may modify or establish the algorithm according to the disclosure of this specification in view of their demands. An embodiment of the predetermined algorithm is shown in FIG. 6, comprising the following steps (carried out by the weighted value estimating unit 320):

Step S610: determining whether an edge detection value (Di) is less than a first threshold (T1). As it is described in the preceding paragraphs, an edge detection value is derived from the pixel values of the target pixel and at least one neighboring pixel.

Step S620: if the edge detection value is less than the first threshold, which implies that the difference between the target pixel and the neighboring pixel(s) is small enough, generating a first calculation value according to this edge detection value and a first equation. In this embodiment, the first equation makes the first calculation value be the maximum weighted value (e.g. $f(Di)=1$).

Step S630: If the edge detection value is greater than the first threshold, which implies that the difference between the target pixel and the neighboring pixel(s) is significant, generating a second calculation value according to this edge detection and a second equation. In this embodiment, the first calculation value of step S620 is greater than the second calculation value, and an example of the second equation is shown below:

$$f(Di)=K\times(Tmax-Di)/(Tmax-T1)$$

in which K is a parameter (e.g. a positive integer equal to or less than Tmax/2) prescribed by those carrying out the present invention, Tmax is the potentially maximum pixel value or the maximum value prescribed by the practitioner. Furthermore, the second equation indicates that the larger than edge detection value Di is (which implies that the difference between the target pixel and the neighboring pixel(s) is larger), the smaller the second calculation value is.

The above-mentioned first or second calculation value itself could be one of the finally outputted weighted values (e.g. the weighted values $W_a$, $W_b$, $W_c$, $W_d$ derived from the edge detection values of FIG. 5) or one of the raw values for the generation of one of the weighted values (e.g. the weighted values $W_a$, $W_b$, $W_c$, $W_d$ derived from the edge detection values of FIG. 4). Please note that the first and second equations could be altered by those of ordinary skill in the art, if necessary.

Figure 7:
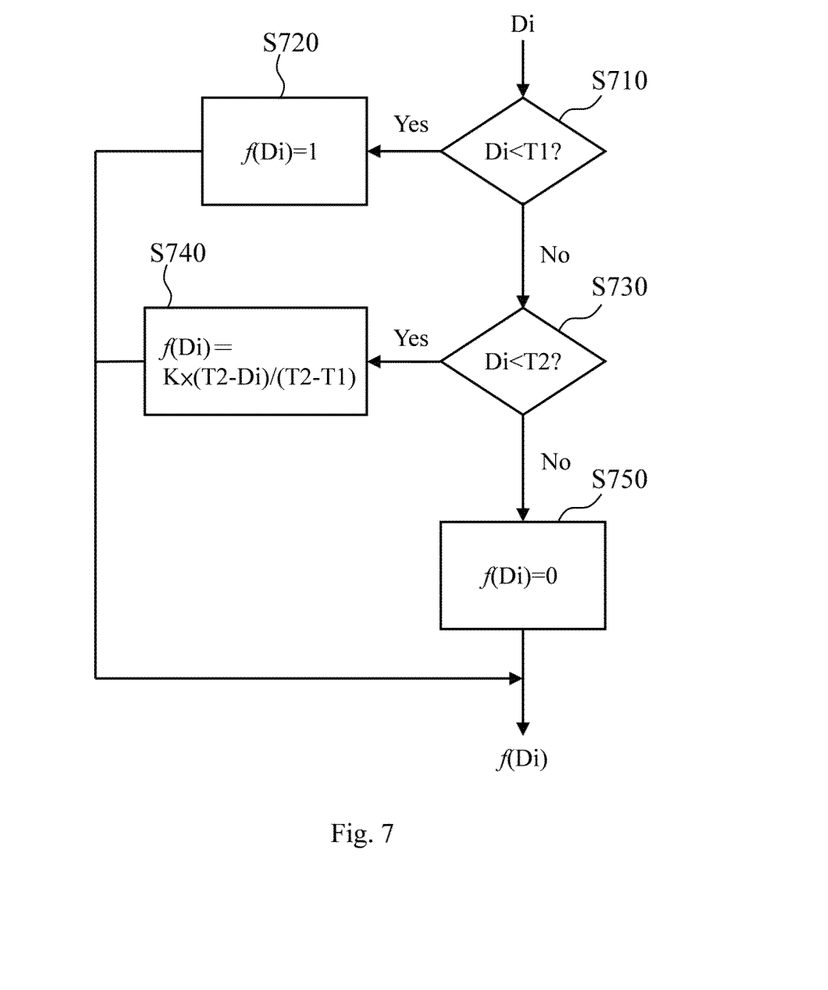
FIG. 7 illustrates another embodiment of the predetermined algorithm of the weighted value estimating unit in FIG. 3.

In addition to the embodiment of FIG. 6, another embodiment of the predetermined algorithm is illustrated in FIG. 7, comprising the following steps (carried out the weighted value estimating unit 320 as well):

Step S710: determining whether an edge detection value (Di) is less than a first threshold (T1). As it is explained in the preceding paragraphs, an edge detection value is derived from the pixel values of the target pixel and at least one neighboring pixel.

Step S720: if the edge detection value is less than the first threshold, which implies that the difference between the target pixel and the neighboring pixel(s) is small enough, generating a first calculation value according to this edge detection value and a first equation. In this embodiment, the first equation makes the first calculation value be the maximum weighted value (e.g. $f(Di)=1$).

Step S730: if the edge detection value is greater than the first threshold, determining whether the edge detection value (Di) is less than a second threshold (T2) which is greater than the first threshold.

Step S740: if the edge detection value is between the first and second thresholds, which implies that the difference between the target pixel and the neighboring pixel(s) is large but not to the extent of an extreme, generating a second calculation value according to the edge detection value and a second equation. In this embodiment, the first calculation value of step S720 is greater than the second calculation value, and an example of the second equation is shown below:

$$f(Di)=K\times(T2-Di)/(T2-T1)$$

in which K is a parameter (e.g. a positive integer equal to or less than T2/2) prescribed by those carrying out the present invention.

Step S750: if the edge detection value is greater than the second threshold, which implies that the difference between the target pixel and the neighboring pixel(s) is quite significant, generating a third calculation value according to the edge detection value and a third equation. In this embodiment, the third equation makes the third calculation value be the minimum weighted value (e.g. $f(Di)=0$); as a result, the first calculation value is greater than the second calculation value while the second calculation value is greater than the third calculation value.

Similarly, the first, second or third calculation value itself could be one of the finally outputted weighted values or datum for the generation of one of the weighted values; this is based on the equation enforced for the generation of weighted values. Please note that in addition to the first and second thresholds, the present invention allows one to employ more thresholds in ascendant order (e.g. the first threshold through the $N_{th}$ threshold in which N is a positive integer greater than 2), so that a proper equation can be assigned to each of the threshold intervals and more accurate weighted values can be obtained through these equations (e.g. the first equation through the $(N+1)_{th}$ equation).

Figure 8:
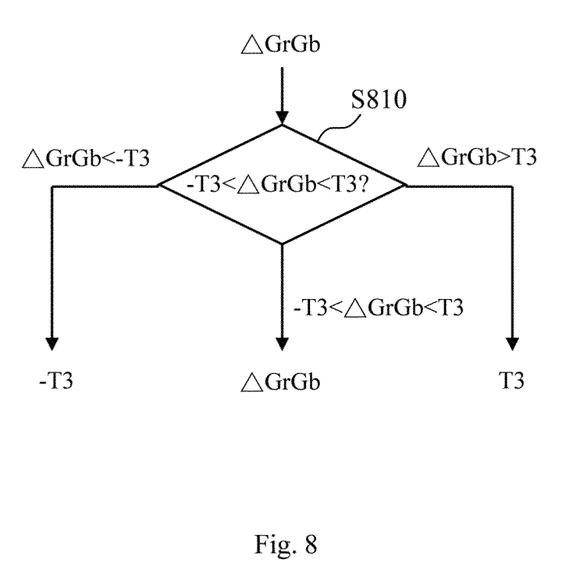
FIG. 8 illustrates an embodiment of how the calibration value generating unit in FIG. 3 excludes extreme values.

After the generation of the weighted values corresponding to the aforementioned candidate pixels, the calibration value generating unit 330 is operable to generate the calibration value according to the pixel value of the target pixel, the pixel value(s) of some or all of the candidate pixels plus the weighted value(s) thereof. However, if the calibration value is an extreme value, it may not be appropriate for the calibration. In consideration of this scenario, the calibration value generating unit 330 of the present invention may be equipped with a function operable to determine whether the calibration value exceeds a threshold limit and output the threshold limit in place of the calibration value if the calibration value goes beyond the threshold limit. For instance, as it is shown in FIG. 8, the calibration value generating unit 330 is operable to execute the following step:

Step S810: determining whether the generated calibration value ($\Delta GrGb$) is greater than a maximum threshold (e.g. T3) or less than a minimum threshold (e.g. $-T3$); if the calibration value is greater than the maximum threshold, outputting the maximum threshold as the calibration value; if the calibration value is less than the minimum threshold, outputting the minimum threshold as the calibration value; and if the calibration value is between the maximum and minimum thresholds, outputting the calibration value directly.

Through the above-mentioned step, the calibration value generating unit 330 is able to confine the outputted calibration value to the interval between the maximum threshold (T3) and the minimum threshold ($-T3$).

After the output of the calibration value, the calibrating unit 340 is operable to generate a calibrated pixel value ($Gr_{0(cal)}$) of the target pixel in accordance with calibration value ($Gr_0$) of the target pixel and the calibration value ($\Delta GrGb$). Take FIG. 4 or FIG. 5 for example; an embodiment for calculating the calibrated pixel value is shown below:

$$Gr_{0(cal)}=Gr_0+\Delta GrGb$$

Certainly one carrying out the present invention is allowed to modify this exemplary equation.

Figure 9:
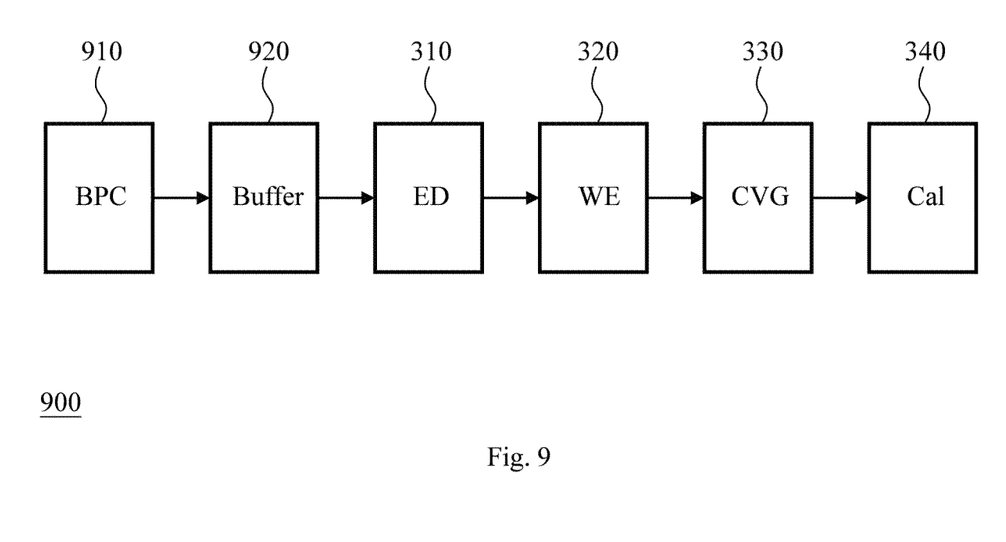
FIG. 9 illustrates another embodiment of the pixel value calibration device of the present invention.
Figure 10:
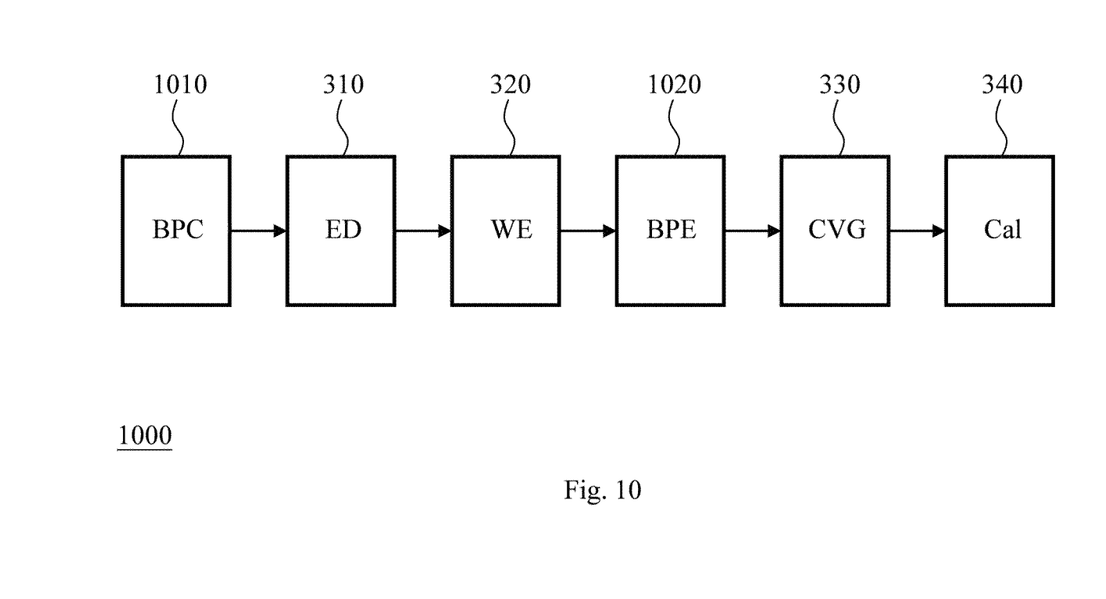
FIG. 10 illustrates a further embodiment of the pixel value calibration device of the present invention.

The fore-described embodiment has mentioned that each pixel in the pixel array could be filtered through a problematic pixel filtering rule before it entering the pixel value calibration device of the present invention; in this case, every candidate pixel passing through the filtering rule and the weighted value of such candidate pixel are all used for the generation of the calibration value, or only a part of the candidate pixels (e.g. at least one candidate pixel whose pixel value is median or overall pixel value difference between itself and the other candidate pixels is minimum) and the weighted value(s) of such candidate pixel(s) are used for the generation of the calibration value. The said problematic pixel filtering rule could be a known rule and carried out by a problematic pixel compensating circuit. For instance, as it is shown in FIG. 9, the pixel value calibration device 900 comprises a problematic pixel compensating circuit (BPC) 910 operable to exclude the problematic pixel(s) in a pixel array tallying with an elimination term (e.g. a bright or dark spot term) according to a known predetermined compensation rule and then output the retained pixels surviving the elimination process to a buffer memory 920. This buffer memory 920 is operable to keep the said retained pixels temporarily and output them to the edge detecting unit 310 for the execution of the calibration procedure in which the retained pixels will include the aforementioned target pixel, neighboring pixels and candidate pixels. In other words, the problematic pixel compensating circuit 910 is capable of prevent the problematic pixel(s) fitting in with the elimination term from entering the calibration procedure. Besides, the fore-described embodiment also mentioned that the pixel array may not be examined completely; in this case, the present invention can make sure that the target pixel is not problematic first, and then filter out the problematic candidate pixel(s). For instance, as it is shown in FIG. 10, the pixel value calibration device 1000 includes a problematic pixel compensating circuit 1010 coupled to the edge detecting unit 310 and operable to verify whether a preselected pixel is a problematic pixel (e.g. a bright dot or a dark dot) in accordance with a predetermined compensation rule and prevent this preselected pixel from being the target pixel if it is found problematic; in other words, if the preselected pixel is found eligible and the color thereof is the aforementioned first color (e.g. the green color Gb or Gr), then the preselected pixel will be allowed to be the target pixel. Furthermore, the pixel value calibration device 1000 may further include a problematic pixel eliminating unit (BPE) 1020 operable to rule out a problematic one (e.g. a pixel whose pixel value is relatively extreme) among the candidate pixels in compliance with a predetermined elimination rule; in the meantime, the calibration value generating unit 330 will generate the calibration value according to the pixel value of the target pixel, the pixel value(s) of the candidate pixel(s) approved by the problematic pixel eliminating unit 1020 and the weighted value of the qualified candidate pixels. Please note that in the embodiment of FIG. 10, since the problematic pixel compensating circuit 1010 only aims at the preselected pixel eligible for the target pixel, there won't be any buffer memory necessary for keeping a lot of pixels during the communication between the compensating circuit 1010 and the edge detecting unit 310, which consequently saves the cost while the neighboring and candidate pixels in the pixel array will be free to enter the edge detecting unit 310 or other units without being examined by the problematic pixel compensating circuit 1010. Please also note that although the present embodiment sets the problematic pixel eliminating unit 1020 behind the weighted value estimating unit 320, this is not a limitation to the implementation of the present invention. In fact, the problematic pixel eliminating unit 1020 may be set anywhere between the problematic pixel compensating circuit 1010 and the calibration value generating unit 330 as long as the problematic candidate pixel(s) can be excluded.

Please refer to FIG. 10 again. The problematic pixel eliminating unit 1020, for example, is a median filter; meanwhile, the predetermined elimination rule is a median filtration rule operable to sift at least a pixel whose pixel value is median from the candidate pixels for the calibration value generating unit 330 to generate the calibration value. Take FIG. 4 or FIG. 5 for example; the candidate pixels are $Gb_a$, $Gb_b$, $Gb_c$, $Gb_d$, and if the ranking of the pixel values of these candidate pixels is $Gb_c > Gb_d > Gb_a > Gb_b$, the problematic pixel eliminating unit 1020 will pick two median candidate pixels $Gb_d$, $Gb_a$ according to the median filtration rule and then output the two candidate pixels $Gb_d$, $Gb_a$ plus the weighted values thereof $W_d$, $W_a$ to the calibration value generating unit 330, so as to let the calibration value generating unit 330 generate the calibration value $\Delta GrGb$ through the following equation:

$$\Delta GrGb = (Gb_d - Gr_0) \times W_d + (Gb_a - Gr_0) \times W_a$$

in which $Gr_0$ is the pixel value of the target pixel. Of course the calibration value generating unit 330 is allowed to generate the calibration value through other equations such as:

$$\Delta GrGb = \{[Gr_0 \times (1 - W_d - W_a) + Gb_d \times W_d + Gb_a \times W_a] - Gr_0\}/2$$

More examples of the equation for generating the calibration value can be derived by those of ordinary skill in the art from the teaching of the present invention in view of their demands.

Please refer to FIG. 10 once more. The problematic pixel eliminating unit 1020 could be an accumulative-difference filter capable of filtering out at least one candidate pixel whose overall pixel value difference between itself and the other candidate pixels is maximum and leaving the following calibration procedure at least one acceptable candidate pixel and the weighted value corresponding thereto. Take FIG. 4 or FIG. 5 for example; provided that the candidate pixels are $Gb_a$, $Gb_b$, $Gb_c$, $Gb_d$, the accumulated differences between each candidate pixel and the other candidate pixels will be:

$$D_a = |Gb_a - Gb_b| + |Gb_a - Gb_c| + |Gb_a - Gb_d|$$

$$D_b = |Gb_b - Gb_a| + |Gb_b - Gb_c| + |Gb_b - Gb_d|$$

$$D_c = |Gb_c - Gb_a| + |Gb_c - Gb_b| + |Gb_c - Gb_d|$$

$$D_d = |Gb_d - Gb_a| + |Gb_d - Gb_b| + |Gb_d - Gb_c|$$

If the ranking of the four accumulated differences is $D_a > D_d > D_c > D_b$, the problematic pixel eliminating unit 1020 may choose two candidate pixels $Gb_c$, $Gb_b$ whose accumulated differences are smallest two and then output the two candidate pixels $Gb_c$, $Gb_b$ and the weighted values $W_c$, $W_b$ thereof to the calibration value generating unit 330, so as to let the calibration value generating unit 330 generate the calibration value.

To sum up, the pixel value calibration device of the present invention is able to carry out calibration against the pixels of the first color (e.g. the green color Gb or Gr), therefore prevent the problem of non-uniformity of the first color, and avoid blurring the texture detail or edge of the image at the same time.

Figure 11:
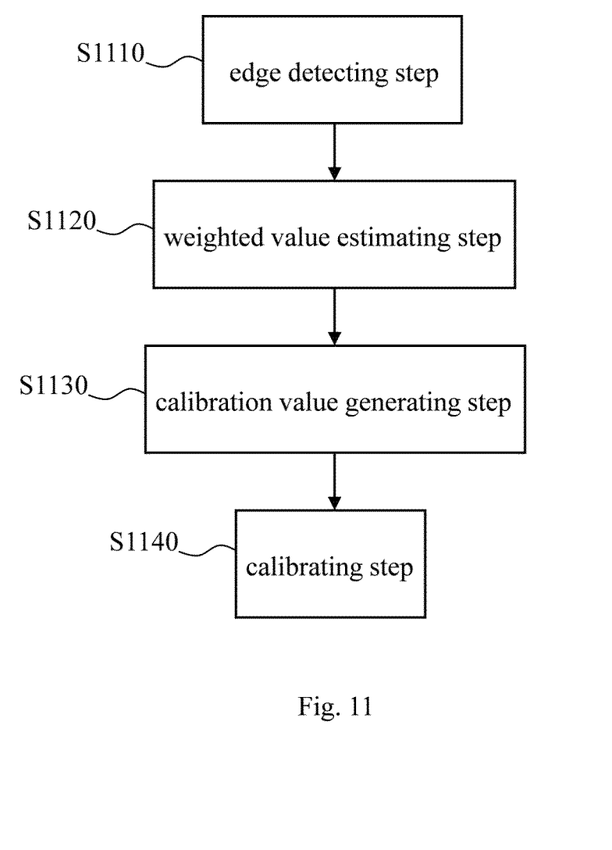
FIG. 11 illustrates an embodiment of the pixel value calibration method of the present invention.

In addition to the pixel value calibration device, the present invention also discloses a pixel value calibration method operable to calibrate the pixel value of a target pixel. As it is shown in FIG. 11, an embodiment of the calibration method comprises the following steps:

Step S1110: an edge detecting step operable to generate a plurality of edge detection values according to the pixel value of a target pixel and the pixel values of several neighboring pixels in which the target and neighboring pixels are of a first color (e.g. green) and each of them is arranged with several pixels of a second color (e.g. blue or red) in the same row of a pixel array. This step can be carried out by the edge detecting unit 310 in FIG. 3 or the equivalent thereof.

Step S1120: a weighted value estimating step operable to generate a plurality of weighted values according to the edge detection values and a predetermined algorithm in which the weighted values are associated with a plurality of candidate pixels while each of the candidate pixels is arranged with several pixels of a third color (e.g. red or blue) in the same row of the pixel array. This step can be executed by the weighted value estimating unit 320 in FIG. 3 or its equivalent.

Step S1130: a calibration value generating step operable to generate a calibration value according to the pixel value of the target pixel and the pixel value(s) of some or all of the candidate pixels plus the weighted value(s) corresponding thereto. This step can be executed by the calibration value generating unit 330 in FIG. 3 or its equivalent.

Step S1140: a calibrating step operable to generate a calibrated pixel value of the target pixel according to the pixel value of the target pixel and the calibration value. This step can be carried out by the calibrating unit 340 in FIG. 3 or the equivalent thereof.

Since people of ordinary skill in the art can appreciate the implementation detail and the modification thereof of this method embodiment in accordance with the fore-disclosed device embodiments, which means that the aforementioned features of the device invention can be applied to the method invention reasonably, repeated and redundant description is therefore omitted while the disclosure and enablement requirements are well considered.

In summary, the pixel value calibration device and method of the present invention can be carried out without greatly altering the configuration of the existing software and/or hardware, and is operable to effectively solving the problem of green color non-uniformity of an image, so that the problems of maze pattern and color tint can be prevented and the green color non-uniformity can be effectively distinguished from the fine texture or edge to avoid blurring the image details. Briefly, the present invention is able to tackle the green color non-uniformity in an economic way while keeping better image resolution and contrast in comparison with the prior arts.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A pixel value calibration device operable to calibrate the pixel value of a target pixel, comprising:
   an edge detecting unit operable to generate a plurality of edge detection values according to the pixel value of the target pixel and the pixel values of several neighboring pixels in which the target and neighboring pixels are of a first color and each of them is arranged with several pixels of a second color in the same row of a pixel array;
   a weighted value estimating unit operable to generate a plurality of weighted values according to the edge detection values and a predetermined algorithm in which the weighted values are associated with a plurality of candidate pixels while each of the candidate pixels is arranged with several pixels of a third color in the same row of the pixel array;
   a calibration value generating unit operable to generate a calibration value according to the pixel value of the target pixel and the pixel value(s) of some or all of the candidate pixels plus the weighted value(s) corresponding thereto; and
   a calibrating unit operable to generate a calibrated pixel value of the target pixel according to the pixel value of the target pixel and the calibration value.

2. The pixel value calibration device of claim 1, wherein the first color is green, the second color is one of red and blue, and the third color is the other one of red and blue different from the second color.

3. The pixel value calibration device of claim 1, wherein the predetermined algorithm employs a first threshold, and the weighted value estimating unit is operable to generate a first calculation value according to a first equation and each of the edge detection values less than the first threshold and generate a second calculation value according to a second equation and each of the edge detection values greater than the first threshold while the first or second calculation value is one of the weighted values or the datum for the generation of one of the weighted values.

4. The pixel value calibration device of claim 3, wherein the first calculation value is greater than the second calculation value.

5. The pixel value calibration device of claim 3, wherein the predetermined algorithm further employs a second threshold greater than the first threshold, and the weighted value estimating unit is operable to generate the second calculation value according to the second equation and each of the edge detection values between the first and second thresholds and generate a third calculation value according to a third equation and each of the edge detection values greater than the second threshold while the first, second or third calculation value is one of the weighted values or the datum for the generation of one of the weighted values.

6. The pixel value calibration device of claim 5, wherein the first calculation value is greater than the second calculation value while the second calculation value is greater than the third calculation value.

7. The pixel value calibration device of claim 1, wherein the calibration value generating unit is further operable to determine whether the calibration value goes beyond a threshold limit, and output the threshold limit as the calibration value if the calibration value goes beyond the threshold limit.

8. The pixel value calibration device of claim 1, further comprising:
   a problematic pixel eliminating unit operable to exclude one or more problematic pixels from the candidate pixels according to a predetermined elimination rule,
   wherein the calibration value generating unit is operable to generate the calibration value according to the pixel value of the target pixel, the pixel value(s) of the candidate pixel(s) passing through the problematic pixel eliminating unit, and the weighted value(s) of the passing candidate pixel(s).

9. The pixel value calibration device of claim 8, wherein the problematic pixel eliminating unit is a median filter or an accumulative-difference filter operable to sift at least one from the candidate pixels for the calibration value generating unit to generate the calibration value.

10. The pixel value calibration device of claim 8, further comprising:

a problematic pixel compensating circuit, coupled to the edge detecting unit, operable to verify whether a preselected pixel is problematic according to a predetermined compensation rule and prevent the preselected pixel from being the target pixel if the preselected pixel is found problematic.

11. The pixel value calibration device of claim 1, further comprising:
a buffer memory operable to keep a plurality of retained pixels and output them to the edge detecting unit; and
a problematic pixel compensating circuit, coupled to the buffer memory, operable to exclude one or more problematic pixels in the pixel array according to a predetermined compensation rule and thereby provide the retained pixels,
wherein the target pixel, the neighboring pixels and the candidate pixels are included in the retained pixels.

12. The pixel value calibration device of claim 1, wherein the pixel array is a Bayer Color Filter Array.

13. A pixel value calibration method operable to calibrate the pixel value of a target pixel, comprising the following steps:
an edge detecting step operable to generate a plurality of edge detection values according to the pixel value of the target pixel and the pixel values of several neighboring pixels in which the target and neighboring pixels are of a first color and each of them is arranged with several pixels of a second color in the same row of a pixel array;
a weighted value estimating step operable to generate a plurality of weighted values according to the edge detection values and a predetermined algorithm in which the weighted values are associated with a plurality of candidate pixels while each of the candidate pixels is arranged with several pixels of a third color in the same row of the pixel array;
a calibration value generating step operable to generate a calibration value according to the pixel value of the target pixel and the pixel value(s) of some or all of the candidate pixels plus the weighted value(s) corresponding thereto; and
a calibrating step operable to generate a calibrated pixel value of the target pixel according to the pixel value of the target pixel and the calibration value.

14. The pixel value calibration method of claim 13, wherein the first color is green, the second color is one of red and blue, and the third color is the other one of red and blue different from the second color.

15. The pixel value calibration method of claim 13, wherein the predetermined algorithm employs a first threshold, and the weighted value estimating step is operable to generate a first calculation value according to a first equation and each of the edge detection values less than the first threshold and generate a second calculation value according to a second equation and each of the edge detection values greater than the first threshold in which the first or second calculation value is one of the weighted values or the datum for the generation of one of the weighted values while the first calculation value is greater than the second calculation value.

16. The pixel value calibration method of claim 15, wherein the predetermined algorithm further employs a second threshold greater than the first threshold, and the weighted value estimating step is operable to generate the second calculation value according to the second equation and each of the edge detection values between the first and second thresholds and generate a third calculation value according to a third equation and each of the edge detection values greater than the second threshold in which the first, second or third calculation value is one of the weighted values or the datum for the generation of one of the weighted values while the second calculation value is greater than the third calculation value.

17. The pixel value calibration method of claim 13, wherein the calibration value generating step is further operable to determine whether the calibration value goes beyond a threshold limit, and output the threshold limit in place of the calibration value if the calibration value goes beyond the threshold limit.

18. The pixel value calibration method of claim 13, further comprising:
a problematic pixel eliminating step operable to exclude one or more problematic pixels from the candidate pixels according to a predetermined elimination rule,
wherein the calibration value generating step is operable to generate the calibration value according to the pixel value of the target pixel, the pixel value(s) of the candidate pixel(s) remaining after the problematic pixel eliminating step, and the weighted value(s) of the remaining candidate pixel(s).

19. The pixel value calibration method of claim 18, further comprising:
a problematic pixel compensating step operable to verify whether a preselected pixel is problematic according to a predetermined compensation rule and prevent the preselected pixel from being the target pixel if the preselected pixel is found problematic.

20. The pixel value calibration method of claim 13, further comprising:
a buffering step operable to keep and output a plurality of retained pixels; and
a problematic pixel compensating step operable to exclude one or more problematic pixels in the pixel array according to a predetermined compensation rule and thereby provide the retained pixels,
wherein the target pixel, the neighboring pixels and the candidate pixels are included in the retained pixels.

* * * * *